(12) United States Patent
Cho et al.

(10) Patent No.: US 8,970,683 B2
(45) Date of Patent: Mar. 3, 2015

(54) DISPLAY APPARATUS, CONTROL METHOD THEREOF, SHUTTER GLASSES AND CONTROL METHOD THEREOF

(75) Inventors: Bong-hwan Cho, Suwon-si (KR); Jae-phil Koo, Seoul (KR); Kang-wook Chun, Seongnam-si (KR); Tae-hyeun Ha, Suwon-si (KR); Hyung-rae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 13/229,842

(22) Filed: Sep. 12, 2011

(65) Prior Publication Data

US 2012/0242811 A1 Sep. 27, 2012

(30) Foreign Application Priority Data

Mar. 21, 2011 (KR) .................. 10-2011-0024841

(51) Int. Cl.
*H04N 13/04* (2006.01)
(52) U.S. Cl.
CPC ....... *H04N 13/0438* (2013.01); *H04N 13/0497* (2013.01); *H04N 13/0422* (2013.01)
USPC .............................. 348/56; 348/51
(58) Field of Classification Search
None
See application file for complete search history.

(56) References Cited

U.S. PATENT DOCUMENTS

| | | | |
|---|---|---|---|
| 8,363,095 B2 * | 1/2013 | Mitani et al. ................. | 348/56 |
| 8,441,528 B2 | 5/2013 | Kim et al. | |
| 8,570,366 B2 | 10/2013 | Haga | |
| 2010/0093408 A1 * | 4/2010 | Chen ........................... | 455/574 |
| 2010/0157425 A1 | 6/2010 | Oh | |
| 2010/0175088 A1 * | 7/2010 | Loebig et al. ................. | 725/40 |
| 2011/0012896 A1 * | 1/2011 | Ji ................................. | 345/419 |
| 2011/0025821 A1 * | 2/2011 | Curtis et al. ................. | 348/43 |
| 2011/0043709 A1 * | 2/2011 | Hirata et al. ................. | 348/734 |
| 2011/0050866 A1 | 3/2011 | Yoo | |
| 2011/0050867 A1 | 3/2011 | Hasegawa et al. | |
| 2011/0199467 A1 * | 8/2011 | Haga ............................. | 348/56 |
| 2011/0234774 A1 * | 9/2011 | Satoh et al. ................... | 348/56 |
| 2012/0169854 A1 * | 7/2012 | Seo et al. ...................... | 348/56 |

FOREIGN PATENT DOCUMENTS

| | | |
|---|---|---|
| CN | 1206843 A | 2/1999 |
| CN | 101963704 A | 2/2011 |
| CN | 102164294 A | 8/2011 |
| EP | 2 360 934 A2 | 8/2011 |
| EP | 2 362 665 A2 | 8/2011 |
| EP | 2 365 699 A2 | 9/2011 |
| KR | 10-1007175 B1 | 1/2011 |

OTHER PUBLICATIONS

International Search Report (PCT/ISA/210), dated Sep. 26, 2012, issued by the International Searching Authority in counterpart International Patent Application No. PCT/KR2012/000070.
Communication dated Jul. 29, 2014 issued by the European Patent Office in counterpart European Patent Application No. 11184844.6.
Office Action issued on Jan. 19, 2015 by The State Intellectual Property Office of P.R. China in counterpart Chinese Application No. 201210073334.2.

\* cited by examiner

*Primary Examiner* — Sath V Perungavoor
*Assistant Examiner* — Janese Duley
(74) *Attorney, Agent, or Firm* — Sughrue Mion, PLLC

(57) ABSTRACT

Disclosed is a method of controlling a display apparatus, a display apparatus and shutter glasses, the method including: establishing a pairing with three dimensional (3D) glasses; receiving first information related to at least one of an operation, a status and a structure of the 3D glasses; storing the first information; and displaying based on the first information, wherein the first information includes information about one of the 3D glasses and the display apparatus.

20 Claims, 8 Drawing Sheets

DISPLAY APPARATUS, CONTROL METHOD THEREOF, SHUTTER GLASSES AND CONTROL METHOD THEREOF

CROSS-REFERENCE TO RELATED APPLICATION

This application claims priority from Korean Patent Application No. 10-2011-0024841, filed on Mar. 21, 2011 in the Korean Intellectual Property Office, the disclosure of which is incorporated herein by reference.

BACKGROUND

1. Field

Apparatuses and methods consistent with exemplary embodiments relate to a display apparatus, a control method thereof, shutter glasses and a control method thereof, and more particularly to a display apparatus, a control method thereof, shutter glasses and a control method thereof, in which a structure for interactive operation between the display apparatus and the shutter glasses in accordance with display images is improved.

2. Description of the Related Art

A display apparatus processes a video signal input from an external video source and displays it as an image on a display panel achieved by a liquid crystal or the like. The display apparatus scans scan lines containing video information on the panel in order to display an image on the panel, and the scan lines are sequentially arranged on the panel, thereby forming one video frame.

An image displayed by the display apparatus is divided into a two dimensional (2D) image and a three dimensional (3D) according to its characteristics. A user's two eyes are different in a view angle, and thus a user can recognize a 3D structure of an object. With this principle, a 3D image is divided into a left-eye image and a right-eye image and displayed on the display apparatus. Further, the display apparatus is provided with 3D glasses for selectively transmitting/blocking light with respect to a user's two eyes. The 3D glasses are achieved by shutter glasses selectively transmitting the light in accordance with whether voltage is applied, or polarizing glasses capable of transmitting light of a preset polarizing direction.

In the case where the 3D glasses are achieved by the shutter glasses, the display apparatus generates a synchronous or "sync" signal corresponding to a displayed 3D image, and transmits it to the shutter glasses. Also, the shutter glasses operate in synchronicity (i.e., "in sync") with the sync signal received from the display apparatus, so that image transmission can be selected with regard to a user's two eyes.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

An aspect of an exemplary embodiment provides a method of controlling a display apparatus, wherein the method may include: establishing a pairing with three dimensional (3D) glasses; receiving first information related to at least one of an operation, a status and a structure of the 3D glasses; storing the received first information; and displaying based on the first information, wherein the first information includes information about one of the 3D glasses and the display apparatus.

The method may further include determining whether a type of 3D glasses is supported in the display apparatus based on the first information; and informing a user of a determination result through a user interface (UI) if the 3D glasses are not supported in the display apparatus.

The method may further include transmitting second information, which is related to at least one of the operation, the status and the structure previously stored in the display apparatus, wherein the second information includes additional information related to one of the 3D glasses and the display apparatus.

The second information may include information related to an on/off driving timing of the 3D glasses.

The second information may include a time delayed from a sync signal.

The second information may include an on/off duty ratio related to a shuttering operation of the 3D glasses.

The second information may include an indicating method of an indicator mounted to the 3D glasses according to an operating status of the 3D glasses.

The first information may include a use time of the 3D glasses.

The first information may include information about a battery state of the 3D glasses.

The first information may include information about an abnormal state of the 3D glasses.

The first information may include information about a polarizing structure of the 3D glasses.

The first information may include at least one of a driving frequency, a rising time and a falling time of the 3D glasses.

The first information may include a transmissivity depending on optical wavelengths of the 3D glasses.

The first information may include information about color coordinates.

Another aspect of an exemplary embodiment provides method of controlling three-dimensional (3D) glasses, wherein the method may include: establishing a pairing with a display apparatus; receiving second information related to at least one of an operation, a status and a structure of the display apparatus; transmitting first information related to at least one of the operation, the status and the structure previously stored in the 3D glasses to the display apparatus, storing the second information; and driving the 3D glasses based on the received second information, wherein the first and second information include information about one of the 3D glasses and the display apparatus.

Another aspect of an exemplary embodiment provides a display apparatus which may include: a display unit; a video processor operable to process a video signal to be displayed as an image on the display unit; a communication unit operable to communicate with three-dimensional (3D) glasses; a storage; and a controller operable to receive first information related to at least one of an operation, a status and a structure of the 3D glasses through the communication unit during pairing with the 3D glasses, operable to store the first information in the storage, and operable to control the video processor to display the image on the display unit based on the first information, wherein the first information includes information about the 3D glasses or the display apparatus.

The controller may be further operable to determine whether a type of 3D glasses is supported in the display apparatus based on the first information, and further operable to inform a user of a determination result through a user interface (UI) if the 3D glasses are not supported in the display apparatus.

The storage may be operable to previously store second information related to at least one of the operation, the status and the structure, wherein the controller is further operable to transmit the second information through the communication unit, and wherein the second information further includes information related to one of the 3D glasses and the display apparatus.

Another aspect of an exemplary embodiment provides a three-dimensional (3D) glasses, which may include: a communication unit operable to communicate with a display apparatus; a storage operable to store first information related to at least one of an operation, a status and a structure of the 3D glasses; and a controller operable to receive second information related to at least one of an operation, a status and a structure of the display apparatus through the communication unit during pairing with the display apparatus, operable to store the second information in the storage, operable to drive the 3D glasses based on the second information, and operable to transmit the first information to the display apparatus through the communication unit, wherein the first and second information includes information about one of the 3D glasses and the display apparatus.

Another aspect of an exemplary embodiment provides a display apparatus, which may include: a display unit; a communication unit operable to communicate with shutter glasses, wherein the communicating includes receiving first information related to characteristics of the shutter glasses; a sync signal processor operable to generate a sync signal and to transmit the sync signal through the communication unit so that the shutter glasses can operate in accordance with a three-dimensional (3D) image displayed on the display unit; a storage operable to store second information; and a controller operable to receive the first information from the shutter glasses through the communication unit, and operable to perform at least one of a first operation, which includes generating and transmitting the sync signal based on the first information and the second information if the first information is received, and a second operation, which includes transmitting the second information to the shutter glasses.

The controller may be further operable to select the second information based on a correspondence with the first information, and further operable to control the sync signal processor based on the selected second information.

The controller may be further operable to control an error message to be displayed on the display unit if the received second information, which corresponds with the first information, is not stored in the storage.

The display apparatus may further include a video processor operable to process a video signal, wherein the controller is further operable to control the video processor to adjust display characteristics of the image based on the first information.

The display characteristics of the image may include at least one of brightness, contrast, color temperature, and color coordinates of the image.

The communication unit may wirelessly communicates with the shutter glasses via one of a radio frequency (RF), Zigbee and Bluetooth.

Another aspect of an exemplary embodiment provides a display apparatus, which may include: a display unit operable to display an image; a video processor operable to process a video signal to be displayed on the display unit; a communication unit operable to communicate with shutter glasses, wherein the communication unit first information related to characteristics of the shutter glasses; a sync signal processor operable to generate a sync signal and to transmit the sync signal via the communication unit; and a controller operable to receive the first information from the shutter glasses via the communication unit, and to control the video processor to adjust display characteristics of the image displayed on the display unit based on the received first information.

The first information may include at least one of manufacturer or model information of the shutter glasses, a use time, a battery state, a polarizing method, an available frequency domain, an operating response time of the shutter glasses and a transmissivity depending on optical wavelengths.

Another aspect of an exemplary embodiment provides shutter glasses which may include: a lens unit operable to selectively transmit light; a communication unit operable to communicate with a display apparatus; a storage operable to store first information related to characteristics of the shutter glasses; a lens driver operable to drive the lens unit based on a sync signal received from the display apparatus via the communication unit; and a controller operable to perform at least one of a first operation, which includes transmitting the first information to the display apparatus, and a second operation, which includes controlling an operation of the lens driver based on the second information if the second information is preset and referenced by the display apparatus when the sync signal is received via the communication unit.

Another aspect of an exemplary embodiment provides a method of controlling a display apparatus, wherein the method may include: receiving from the shutter glasses first information related to characteristics of shutter glasses; previously setting up second information to be referenced when generating a sync signal for operating the shutter glasses in accordance with a displayed three-dimensional (3D) image; and performing at least one of a first operation, which includes generating and transmitting the sync signal, based on the first information and the second information, to the shutter glasses when receiving the first information, and a second operation, which includes transmitting the second information to the shutter glasses so that the.

The performing at least one of the first operation and the second operation includes selecting the second information corresponding to the first information, and generating and transmitting the sync signal based on the selected second information.

The generating and transmitting the sync signal based on the selected second information comprises displaying an error message when there is no second information corresponding to the first information.

The first information may include at least one of manufacturer or model information of the shutter glasses, a use time, a battery state, a polarizing method, an available frequency domain, an operating response time of the shutter glasses and a transmissivity depending on optical wavelengths.

The second information may include at least one of a delayed value of the sync signal and a duty value of the sync signal, and the performing at least one of the first and second operations includes adjusting a timing of the sync signal based on the second information selected corresponding to the first information.

The performing at least one of the first and second operations may include adjusting display characteristics of the image corresponding to the first information.

Another aspect of an exemplary embodiment provides a method of controlling shutter glasses having a lens unit, wherein the method may include: driving the lens unit to selectively transmit light with a sync signal received from a display apparatus; previously storing first information related to characteristics of the shutter glasses; and performing at least one of a first operation, which includes transmitting the first information to the display apparatus, and a second operation, which includes controlling an operation of the lens unit based on the second information if the second information preset and referenced by the display apparatus when generating the sync signal is received from the display apparatus.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings.

Figure 1:
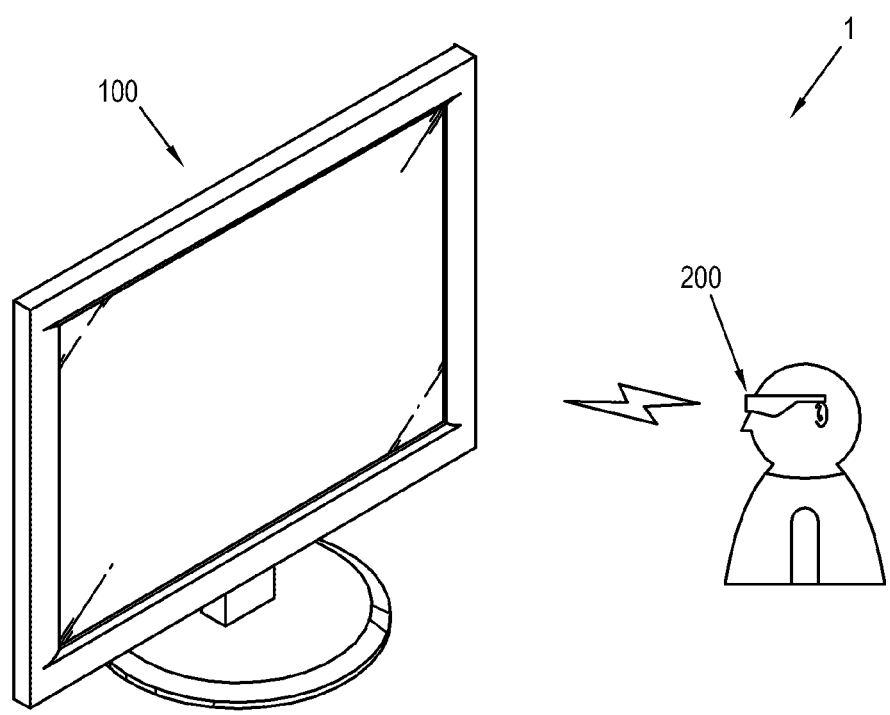
FIG. 1 shows an example of a display system according to a first exemplary embodiment.

FIG. 1 shows an example of a display system 1 according to a first exemplary embodiment.

As shown in FIG. 1, the display system 1 in this exemplary embodiment includes a display apparatus 100 that processes a video signal input from the exterior and displays it as an image, and 3-dimensional (3D) glasses 200 that operate to selectively transmit or interrupt light if an image displayed on the display apparatus 100 is a 3D image.

The display apparatus 100 receives a video signal from an external video source (not shown). Such a video source is not limited, and thus the display apparatus 100 may receive video signals from various video sources such as a computer main body (not shown) that generates a video signal with a central processing unit (CPU, not shown) and a graphic card (not shown), and provides it locally; a server (not shown) that provides a video signal via a network; a transmitter (not shown) of a broadcasting station that transmits a broadcasting signal via airwaves or cables; etc.

The display apparatus 100 receives a 2-dimensional (2D) video signal corresponding to a 2D image or a 3D video signal corresponding to a 3D image from the exterior, and processes it to be displayed as an image. As opposed to the 2D image, the 3D image includes a left-eye video frame corresponding to a user's left-eye, and a right-eye video frame corresponding to a user's right-eye. If receiving the 3D video signal, the display apparatus 100 alternately displays the left-eye video frame and the right-eye video frame on the basis of the 3D video signal.

The 3D glasses 200 may be achieved by shutter glasses 200. When the display apparatus 100 displays a 3D image, the shutter glasses 200 selectively opens and shuts view for a user's left or right eye in accordance with which one of the left-eye video frame and the right-eye video frame is being currently displayed. For example, if the display apparatus 100 is displaying the left-eye video frame, the shutter glasses 200 open a user's left-eye view and shut a user's right-eye view. On the other hand, if the display apparatus 100 is displaying the right-eye video frame, the shutter glasses 200 opens a user's right-eye view and shuts a user's left-eye view.

Thus, to match the 3D image displayed on the display apparatus 100 with selective light transmission and/or interruption of the shutter glasses 200, the display apparatus 100 generates a sync signal corresponding to display timing of a video frame and sends it to the shutter glasses 200, and the shutter glasses 200 operate on the basis of the received sync signal.

Figure 2:
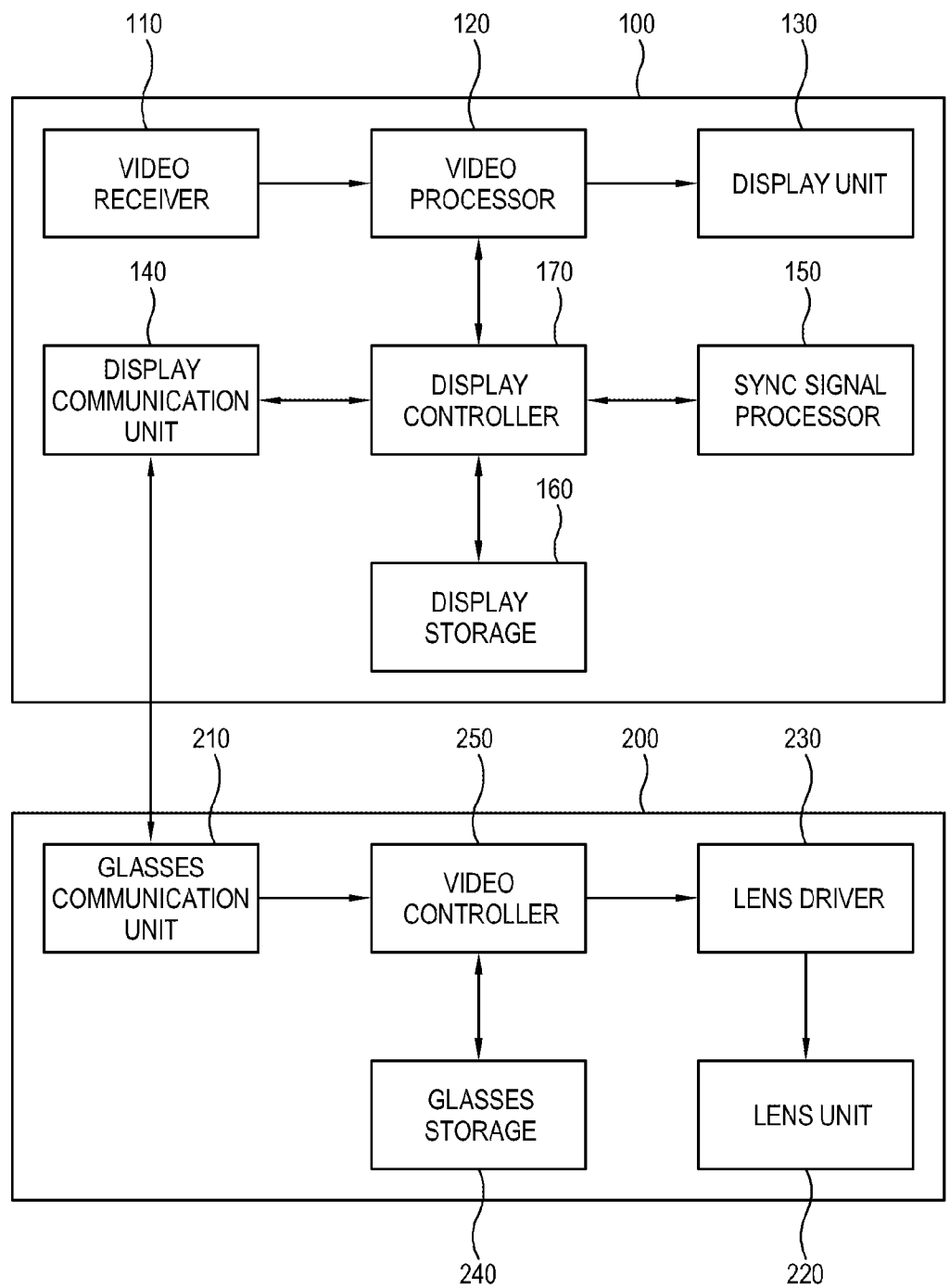
FIG. 2 is a block diagram of a display apparatus and shutter glasses in the display system of FIG. 1.

Below, respective configurations of the display apparatus 100 and the shutter glasses 200 will be described with reference to FIG. 2. FIG. 2 is a block diagram of the display apparatus 100 and the shutter glasses 200 in the display system, an example of which is shown in FIG. 1.

As shown in FIG. 2, the display apparatus 100 includes a video receiver 110 that receives a video signal, a video processor 120 that processes the video signal received in the video receiver 110, the display unit 130 that displays the video signal processed by the video processor 120 into an image, a display communication unit 140 that communicates with the shutter glasses 200, and a sync signal processor 150 that generates a sync signal corresponding to a 3D image displayed on the display unit 130 and transmits the sync signal through the display communication unit 140.

Meanwhile, the shutter glasses 200 includes a glasses communication unit 210 that communicates with the display communication unit 140 and receives the sync signal, a lens unit 220 that operates to transmit/interrupt light with respect to a user's left- and right-eyes, and a lens driver 230 that drives the lens unit 220 in sync with the sync signal received by the glasses communication unit 210.

Below, each element of the display apparatus 100 will be described.

The video receiver 110 receives a video signal and transmits it to the video processor 120, and may be achieved in various forms according to formats of the received video signals and the types of display apparatus 100.

For example, if the display apparatus 100 is a television, the video receiver 110 may wirelessly receive a radio frequency (RF) signal from a broadcasting station (not shown), or may receive a video signal based on composite video, component video, super video, Syndicat des Constructeurs des Appareils Radiorécepteurs et Téléviseurs (SCART), high definition multimedia interface (HDMI) or the like standards via a cable. If the video signal is a broadcasting signal, the video receiver 110 includes a tuner to be tuned to a channel corresponding to the video signal.

If the display apparatus 100 is a monitor for a computer, the video receiver 100 may comply with D-SUB capable of transmitting RGB signals based on video graphics array (VGA); digital video interactive (DVI)-analog (A), DVI-integrated digital/analog (I), DIV-digital (D), based on DVI; HDMI, or the like standards. Also, the video receiver 110 may be achieved by DisplayPort, unified display interface (UDI), or wireless HD, etc.

The video processor 120 may perform various video processes previously set up to a video signal. The video processor 120 performs such a process and outputs the video signal to the display unit 130 so that the display unit 130 can display an image.

The kind of video processes performed by the video processor 120 is not limited, and may for example include decoding and encoding corresponding to various video formats, de-interlacing, frame refresh rate conversion, scaling, noise reduction for improving picture quality, detail enhancement, line scanner, etc. The video processor 120 may be achieved by individual configurations where respective processes are independently performed, or an integrated configuration where many functions are integrated.

There is no limit to a method of achieving the display unit 130, and for example, a liquid crystal display (LCD) panel may be used for the display unit 130. The display unit 130 displays an image based on the video signal processed by the video processor 120. The display unit 130 may display a video frame by vertically arranging a plurality of horizontal scan lines scanned by the video processor 120.

The display communication unit 140 transmits a sync signal from the sync signal processor 150 to the shutter glasses 200. The display communication unit 140 may comply with RF, Zigbee, Bluetooth or the like interactive wireless communication standards. Thus, various signal/information/data may be transmitted and received between the display apparatus 100 and the shutter glasses 200 without limitation.

The sync signal processor 150 generates a sync signal synchronized with display timing of a 3D image displayed on the display unit 130, and sends it to the display communication unit 140 so that the sync signal can be transmitted to the shutter glasses 200. The sync signal processor 150 generates and sends the sync signal on the basis of information previously set up when generating the sync signal, details of which will be described later.

Below, each element of the shutter glasses 200 will be described.

The glasses communication unit 210 is provided to comply with the communication standards of the display communication unit 140, and interactively communicates with the display communication unit 140. As a 3D image is displayed in the display apparatus 100, the glasses communication unit 210 receives the sync signal from the display apparatus 100.

The lens unit 220 operates to selectively transmit/interrupt light with regard to a user's two eyes under control of the lens driver 230. Like this, the lens unit 220 selectively transmits light with regard to a user's two eyes, so that a user can perceive a left-eye video frame and a right-eye video frame displayed on the display unit 130 through his/her left and right eyes, respectively.

There is no limit to a method of achieving the lens unit 220, and for example, the lens unit 220 may be achieved by a liquid crystal lens that interrupts light when receiving a predetermined voltage from the lens driver 230, but transmits light when receiving no voltage. However, this is nothing but an example. Alternatively, the lens unit 220 may transmit light when receiving the voltage, and interrupt light when receiving no voltage. Also, the lens unit 220 may have light transmissivity varied depending on the applied voltage levels.

The lens driver 230 selectively applies voltage to the lens unit 220 in sync with the sync signal received in the glass communication unit 210. For example, the lens driver 230 drives the lens unit 220 to transmit light for a user's left eye and interrupt light for a user's right eye in a vertical sync section where the left-eye video frame is displayed. Further, the lens driver 230 drives the lens unit 220 to interrupt the light while a video frame is scanned in the display unit 130. However, this is nothing but one example of a method in which the lens driver 230 drives the lens unit 220, and does not limit the scope of the exemplary embodiment.

With this structure, the display apparatus 100 displays a 3D image based on the video signal on the display unit 130, and generates a sync signal corresponding to the displayed image and transmits it to the shutter glasses 200. The shutter glasses 200 drives the lens unit 220 in sync with the sync signal received from the display apparatus 100. Accordingly, the shutter glasses 200 operate to selectively transmit/interrupt light in accordance with the 3D image displayed on the display apparatus 100, and a user can perceive the left-eye video frame and the right-eye video frame with his/her left and right eyes through the shutter glasses 200, respectively.

However, the display apparatus 100 and the shutter glasses 200 are given separately from each other, and therefore at least one of the display apparatus 100 and the shutter glasses 200 may be replaced by a new different one. For example, the shutter glasses 200 may be replaced by a new one different in a manufacturer or a model.

At interactive operation between the display apparatus 100 and the shutter glasses 200 as the 3D image is displayed, the display apparatus 100 generates and transmits a sync signal based on the preset information. Such preset information is set up in consideration of the characteristics of the shutter glasses 200, and therefore if the shutter glasses 200 are replaced by a new one different in a manufacturer or a model as described above, there may be an operation error since the operation of the shutter glasses may not be matched with the display apparatus 100 due to difference in operating characteristics between the shutter glasses. In this case, a user may not normally appreciate the 3D image.

According to this exemplary embodiment, the shutter glasses 200 includes a glasses storage 240 in which preset first information is stored, and a glasses controller 250 operating to transmit the first information to the display apparatus 100 when the display apparatus 100 displays a 3D image.

Further, the display apparatus 100 includes a display storage 160 in which preset second information is stored, and a display controller 170 operating to generate and transmit a sync signal based on the first and second information when receiving the first information from the shutter glasses 200.

Here, the first information and the second information may be information related to at least one of operation, status and structure of the shutter glasses 200 and the display apparatus 100.

In more detail, the first information is preset information/data related to the shutter glasses' own characteristics without limitation, and may for example include a serial number of the shutter glasses 200, a manufacturer or model of the shutter glasses 200, an accumulative use time of the shutter glasses 200, a current battery residual quantity of the shutter glasses 200, a polarizing type of the lens unit 220, a frequency domain available for the shutter glasses 200, rising and falling time corresponding to light transmission and/or interruption, operating response time of the shutter glasses 200, transmissivity of the lens unit 220 according to optical wavelengths, color coordinates information, unusual condition information of the shutter glasses 200, on/off driving timing information, etc.

Also, the second information is information/data referred to by the sync signal processor 150 for generating the sync signal without limitation, and may for example include various information for driving the shutter glasses 200 such as a delay value related to delayed time of a sync signal, an on/off duty ratio of a sync signal related to a shuttering operation of the shutter glasses 200, an indicating method of an indicator (not shown) mounted to the shutter glasses 200 according to the operating status of the shutter glasses 200, etc. Here, the indicating method according to the operating status of the shutter glasses 200 is for individually corresponding to protocols different according to respective products with regard to indication of power on/off, pairing, abnormal operation, etc.

In the following description, the first and second information comply with the above definition, and such terms are just for convenience of classification.

Figure 3:
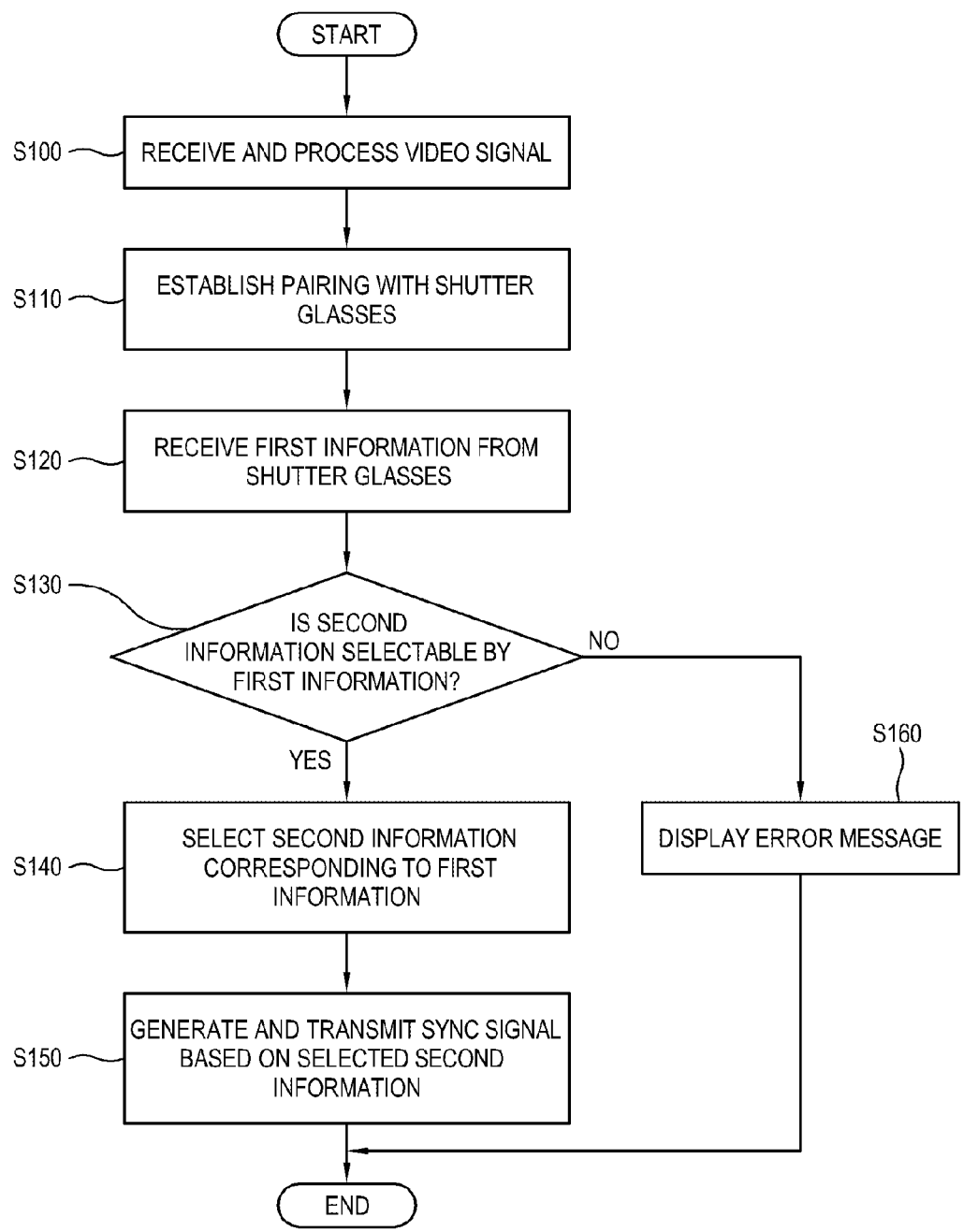
FIG. 3 is a control flowchart showing a control method of the display apparatus of FIG. 1.

With this configuration, a control method of a display apparatus 100 according to an exemplary embodiment will be described with reference to FIG. 3. FIG. 3 is a control flowchart showing an example of the control method of the display apparatus 100.

As shown in FIG. 3, if the video receiver 110 receives a 3D video signal, the video processor 120 processes this video signal to be displayed on the display unit 130 at operation S100.

At operation S110, the display controller 170 establishes pairing with the shutter glasses 200 through the display communication unit 140. The pairing is a connecting operation for enabling interactive communication between the display apparatus 100 and the shutter glasses 200, which complies with various communication standards such as RF, Zigbee, Bluetooth, etc.

At operation S120, the display controller 170 receives the first information from the shutter glasses 200. The reception of the first information may be set up to be automatically implemented during a pairing process, or may be achieved as the display controller 170 transmits a signal requesting for the first information to the shutter glasses 200 when the pairing is completed.

At operation S130, the display controller 170 determines whether the second information is selectable by the first information received from the shutter glasses 200.

If it is determined that the second information is selectable by the first information, the display controller 170 selects the second information corresponding to the first information at operation 5140. At operation 5150, the sync signal processor 150 generates and transmits a sync signal based on the selected second information.

A method of selecting the second information by the first information may be designed variously and does not limit the scope of the inventive concept. For example, the display storage 160 may store a plurality of second information corresponding to a plurality of first information in the form of a table. In this case, the display controller 170 may select one of the second information corresponding to the received first information, among the plurality of second information stored in the display storage 160.

More specifically, for example, the display storage 160 stores setup tables where delayed values of the sync signal are respectively set up corresponding to the serial numbers of the shutter glasses 200. The display controller 170 may search the setup table for a delayed value of the sync signal corresponding to the serial number received from the shutter glasses 200.

In the case where the display controller 170 selects one among the plurality of second information, the sync signal processor 150 generates and transmits a sync signal on the basis of the selected second information. Specifically, the sync signal processor 150 may apply an offset to a default value of a timing period of a sync signal on the basis of the selected second information, thereby adjusting the timing period of the sync signal.

On the other hand, if it is determined that the second information is not selectable by the first information, the display controller 170 controls the display unit 130 to display an error message at operation 5160. Such an error message may be accomplished by a user interface (UI), on screen display (OSD), etc. As illustrated above, if there is no value corresponding to the serial number of the shutter glasses 200 in the setup table of the display storage 160, the display controller 170 controls the display unit 130 to display a message to the effect that these shutter glasses 200 are not supported in this display apparatus 100, thereby giving information to a user.

Thus, according to an exemplary embodiment, the display apparatus 100 receives characteristic information of the shutter glasses 200, and generates and transmits a sync signal on the basis of the received information, so that the display apparatus 100 and the shutter glasses 200 can interactively operate even though at least one of the display apparatus 100 and the shutter glasses 200 is replaced by a new one different in a model. Accordingly, a user can normally appreciate a 3D image.

Figure 4:
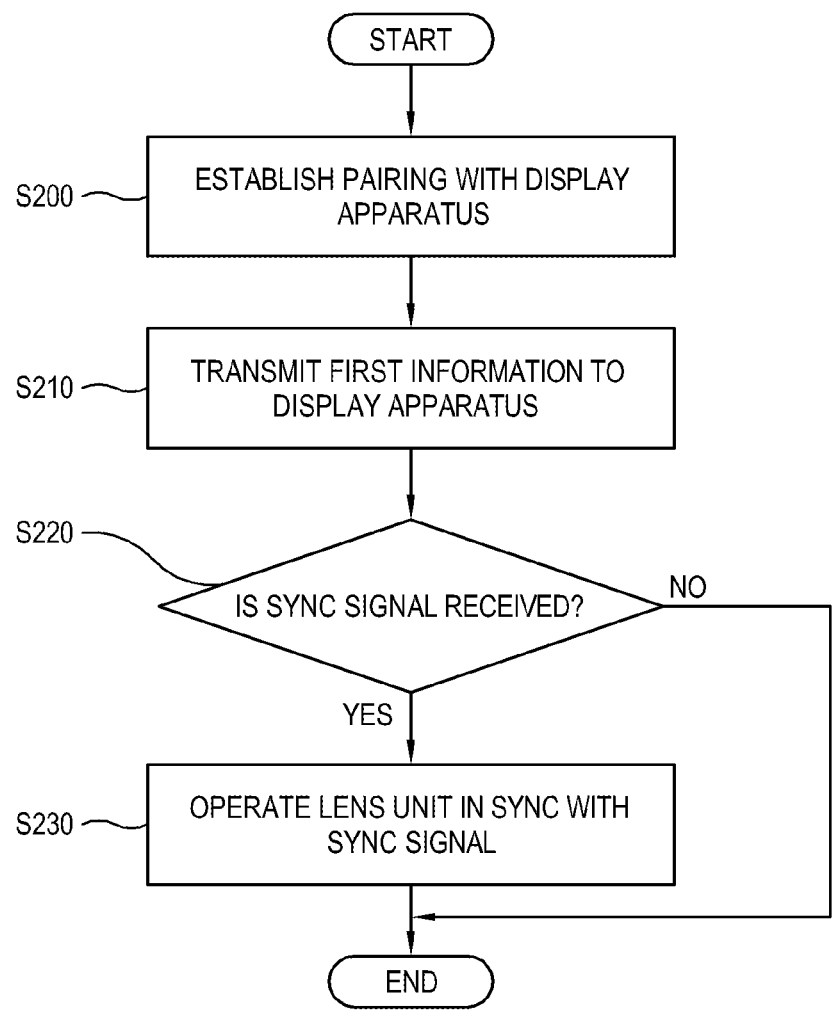
FIG. 4 is a control flowchart showing a control method of the shutter glasses of FIG. 1.

Meanwhile, a control method of the shutter glasses 200 corresponding to the above control method of the display apparatus 100 will be described with reference to FIG. 4. FIG. 4 is a control flowchart showing an example of a control method of the shutter glasses of FIG. 1.

At operation S200, the shutter glasses 200 establish pairing with the display apparatus 100. At operation S210, the glasses controller 250 transmits the first information stored in the glasses storage 240 to the display apparatus 100 in response to the establishment of the pairing with the display apparatus 100 or a request from the display apparatus 100.

At operation S220, the glasses controller 250 monitors whether the sync signal is received from the display apparatus 100. If receiving the sync signal generated based on the first and second information from the display apparatus 100, the glasses controller 250 controls the lens unit 220 to operate in sync with this sync signal at operation S230.

Figure 5:
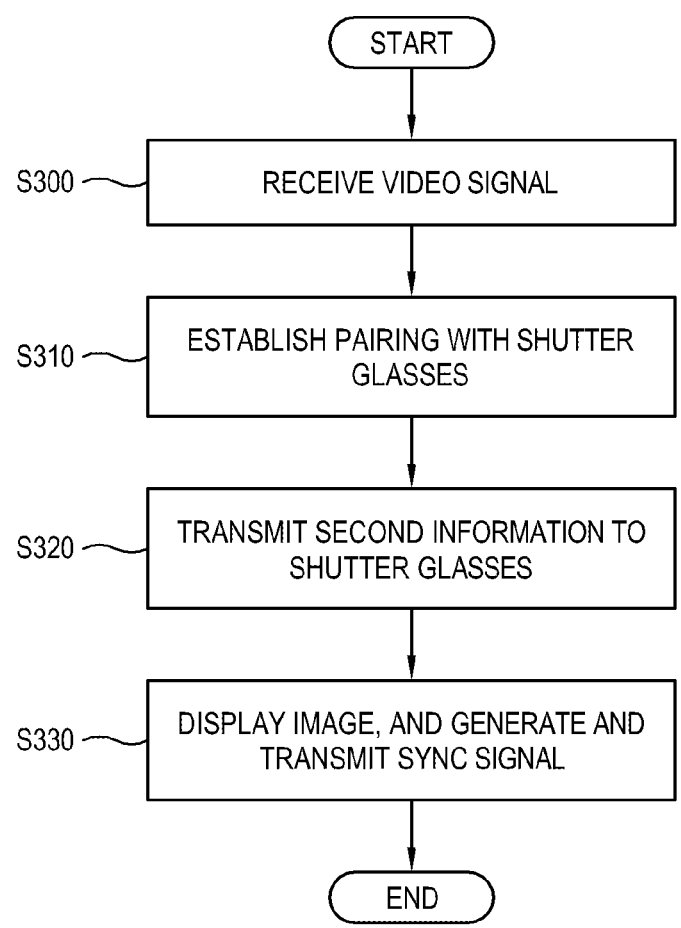
FIG. 5 is a control flowchart showing a control method of a display apparatus according to a second exemplary embodiment.

As an alternative to the first exemplary embodiment, the shutter glasses 200 may receive the second information from the display apparatus 100 and operate on the basis of the received second information, which will be described as a second exemplary embodiment. Below, a control method of a display apparatus according to the second exemplary embodiment will be described with reference to FIG. 5. FIG. 5 is a control flowchart showing an example of such processes.

As shown in FIG. 5, if the video receiver 110 receives a 3D video signal at operation S300, the display controller 170 establishes the pairing with the shutter glasses 200 through the display communication unit 140 at operation S310.

At operation S320, the display controller 170 transmits the second information stored in the display storage 160 to the shutter glasses 200. At operation S330, the video processor 120 displays an image on the display unit 130, and the sync signal processor 150 transmits a sync signal corresponding to the displayed image to the shutter glasses 200.

Figure 6:
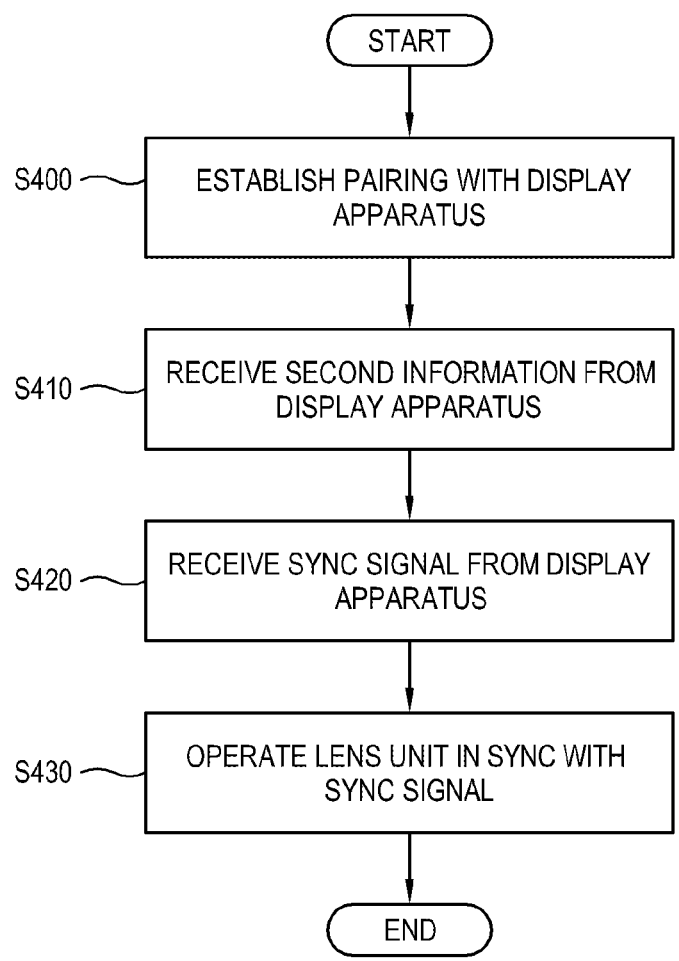
FIG. 6 is a control flowchart showing a control method of shutter glasses according to a second exemplary embodiment.

Below, a control method of the shutter glasses 200 will be described with reference to FIG. 6. FIG. 6 is a control flowchart showing an example of such processes.

As shown in FIG. 6, the shutter glasses 200 establish the pairing with the display apparatus 100 at operation S400. At operation S410, the glasses controller 250 receives the second information from the display apparatus 100 in accordance with the pairing with the display apparatus 100.

At operation S420, the glasses controller 250 receives a sync signal from the display apparatus 100. At operation S430, the glasses controller 250 controls the lens unit 220 to be driven on the basis of the received second information.

Such a method of controlling the lens unit 220 to be driven on the basis of the second information may be designed variously, and does not limit the scope of the inventive concept. For example, the second information may contain a duty value of the sync signal, i.e., a value for designating a light transmission and/or interruption ratio of the lens unit 220 per unit period. The glasses controller 250 may read such a designation value from the second information, and compensates for the operation of the lens unit 220 by taking this read value into account when controlling the light transmission and/or interruption of the lens unit 220 in sync with the sync signal.

Thus, although at least one of the display apparatus 100 and the shutter glasses 200 is replaced, it is possible to adjust interactive operation to be enabled between the display apparatus 100 and the shutter glasses 200.

In the foregoing first exemplary embodiment, the display apparatus 100 is configured to receive the first information from the shutter glasses 200, and generate and transmit the sync signal based on the first and second information, but not limited thereto. Alternatively, the display apparatus 100 may be configured to adjust display characteristics of an image displayed on the display unit 130 instead of the sync signal, on the basis of the received first information, which will be described as a third exemplary embodiment in the following.

Figure 7:
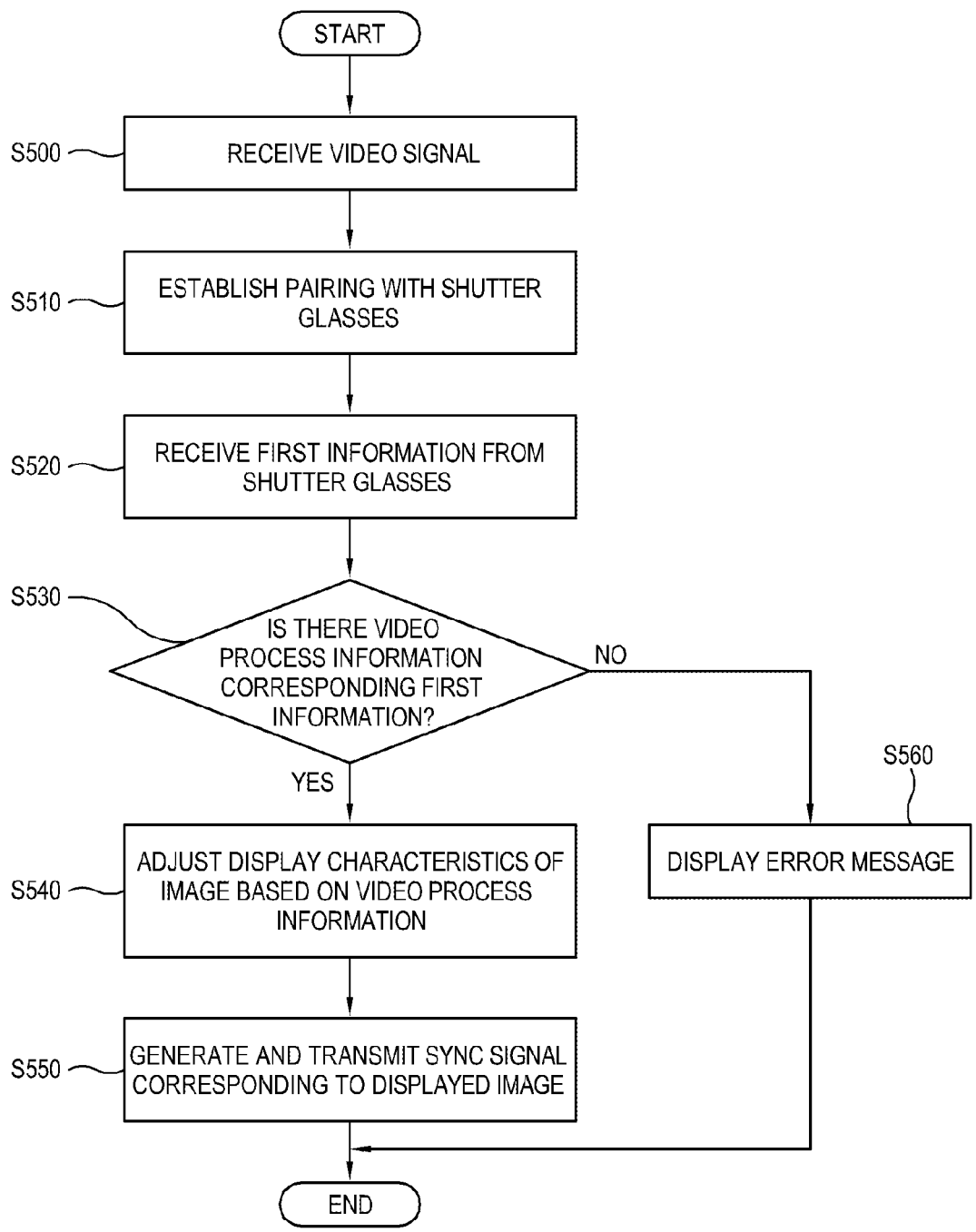
FIG. 7 is a control flowchart showing a control method of a display apparatus according to a third exemplary embodiment.

FIG. 7 is a control flowchart showing an example of a control method of a display apparatus according to the third exemplary embodiment.

As shown therein, if the video receiver 110 receives a video signal at operation S500, the display controller 170 establishes the pairing with the shutter glasses 200 at operation S510.

At operation S520, the display controller 170 receives the first information from the shutter glasses 200. At operation S530, the display controller 170 searches whether there is video process information corresponding to the received first information among preset video process information stored in the display controller 160.

If there is the video process information corresponding to the first information, at operation S540 the display controller 170 controls the video processor 120 to adjust the display characteristics of an image on the basis of the corresponding video process information. Accordingly, the image of which display characteristics are adjusted is displayed on the display unit 130. Also, at operation S550 the display controller 170 generates a sync signal corresponding to the displayed image, and transmits it to the shutter glasses 200.

Accordingly, characteristics of an image displayed in the display apparatus 100 can be adjusted in accordance with the characteristics of the shutter glasses 200.

Specific methods of adjusting the display characteristics of the image may be designed variously, and do not limit the scope of the inventive concept. For example, the display storage 160 may store video process information containing offset values to the brightness, contrast, color temperature, color coordinates, etc. of a displayed image in accordance with various shutter glasses 200. The display controller 170 selects one corresponding to the received first information among the video process information and transmits it to the video processor 120.

On the basis of the selected video process information, the video processor 120 adjusts a value such as the brightness, contrast, color temperature, color coordinates, etc. of an image displayed on the display unit 130.

On the other hand, if there is no video process information corresponding to the first information, the display controller 170 displays an error message on the display unit 130 at operation S560. Alternatively, the display controller 170 may display an image based on default settings instead of displaying the error message.

Meanwhile, the foregoing first exemplary embodiment may be applied to the control method of the shutter glasses 200 according to this exemplary embodiment, and thus repetitive descriptions thereof will be avoided as necessary.

In the foregoing exemplary embodiments, only one of the display apparatus 100 and the shutter glasses 200 receives the information and operates in accordance with the received information, but not limited thereto. Alternatively, the display apparatus 100 and the shutter glasses 200 may exchange their information with each other, and respectively operate in accordance with the exchanged information, which will be described as a fourth exemplary embodiment in the following.

Figure 8:
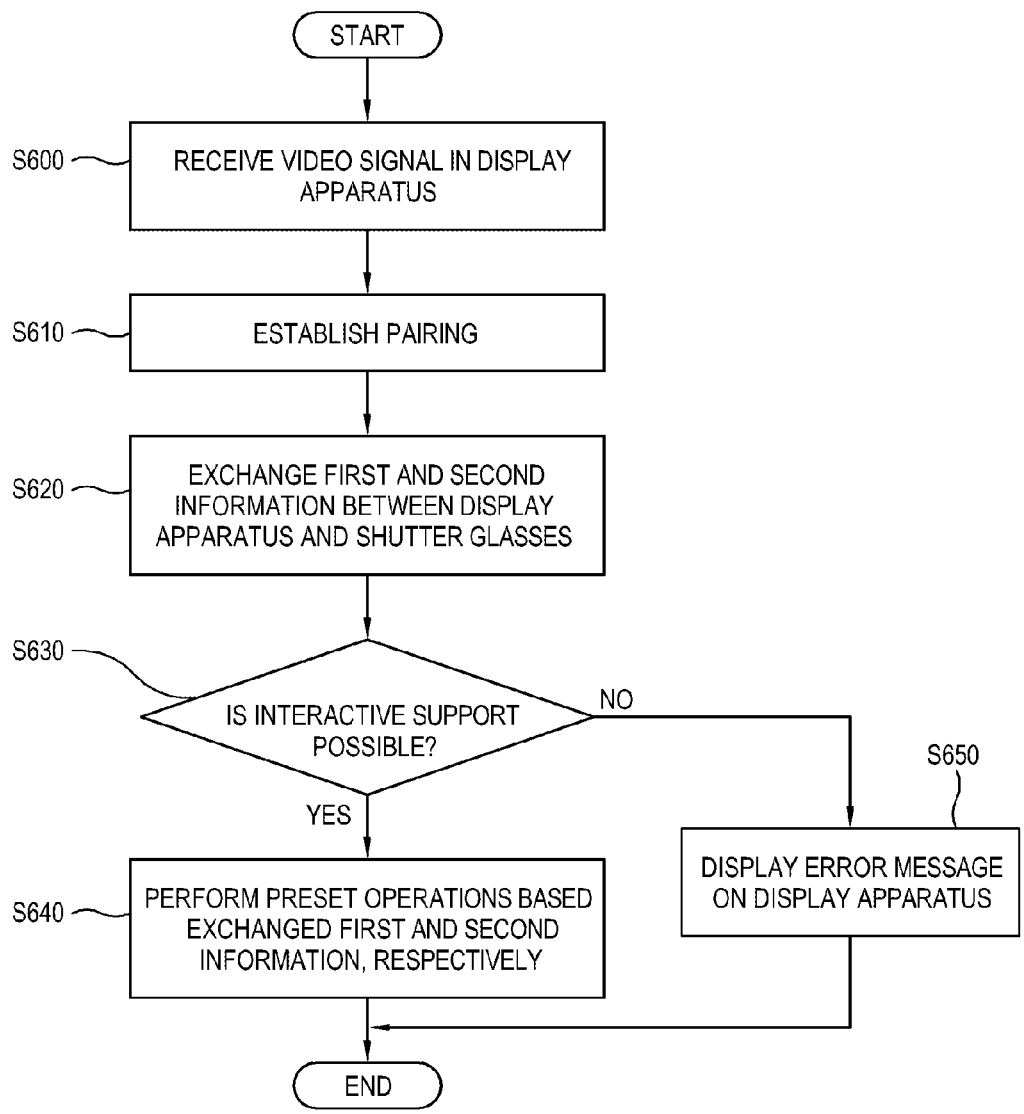
FIG. 8 is a control flowchart showing a control method of a display system according to a fourth exemplary embodiment.

FIG. 8 is a control flowchart showing an example of a control method of a display system according to the fourth exemplary embodiment.

As shown in FIG. 8, the display apparatus 100 receives a video signal at operation S600. The display apparatus 100 and the shutter glasses 200 establish pairing therebetween at operation S610.

On the basis of the pairing, the display apparatus 100 and the shutter glasses 200 exchange the first information and the second information with each other at operation S620. That is, the display apparatus 100 receives the first information from the shutter glasses 200, and transmits the second information to the shutter glasses 200. On the other hand, the shutter glasses 200 receive the second information from the display apparatus 100 and transmit the first information to the display apparatus 100.

At operation S630, the display apparatus 100 and the shutter glasses 200 determine whether they can interactively support the other parties 100 and 200 on the basis of the exchanged first and second information. That is, the display apparatus 100 determines whether the shutter glasses 200 are supportable on the basis of the first information, and the shutter glasses 200 determine whether the display apparatus 100 is supportable on the basis of the second information.

For example, the display apparatus 100 determines that the corresponding shutter glasses 200 are supportable if the adjustment of the sync signal, the adjustment of image display characteristics, or the like operation control of the display apparatus 100 is possible in accordance with characteristic information of the shutter glasses 200 contained in the first information. Such a determination method may be designed variously, and does not limit the scope of the inventive concept.

If it is determined that the support is possible, the display apparatus 100 and the shutter glasses 200 perform preset operations on the basis of the first/second information, respectively (S640).

For example, the display apparatus 100 may adjust a timing period of a sync signal by a predetermined value from a default value on the basis of the first information and transmit it, or adjust display characteristics of a 3D image. The shutter glasses 200 may adjust a light transmission and/or interruption ratio of the lens unit 220 per unit period on the basis of the second information. However, the above preset operations may be designed variously, and the foregoing exemplary embodiments may be applied to these operations. Therefore, repetitive descriptions thereof will be avoided.

If it is determined that at least one of the display apparatus 100 and the shutter glasses 200 is not supportable, the display apparatus 100 may display an error message containing a corresponding determination result at operation S650.

Thus, the display apparatus 100 and the shutter glasses 200 exchanges information with each other, and may perform the preset operations corresponding to the exchanged information, respectively.

As described above, the display apparatus 100 receives the first information from the shutter glasses 200 when displaying a 3D image, and performs at least one of a first operation of generating and transmitting a sync signal based on the first and second information when receiving the first information and a second operation of transmitting the second information to the shutter glasses 200 so that the shutter glasses 200 can operate on the basis of the second information. A matter about whether to perform one of the first and second operations or to perform both operations is previously set up in the display apparatus 100 and the shutter glasses 200, and may be changed as necessary.

Also, the shutter glasses 200 may perform at least one of a third operation of transmitting the first information to the display apparatus 100 so as to receive the sync signal generated by the display apparatus 100 based on the first information, and a fourth operation of controlling the light transmission and/or interruption of the lens unit 220 on the basis of the second information received from the display apparatus 100. A matter about whether to perform one of the third and fourth operations or to perform both operations is previously set up in the display apparatus 100 and the shutter glasses 200, and may be changed as necessary.

Meanwhile, in the operation of establishing the pairing, the display apparatus 100 may store the first information about the paired shutter glasses 200 in the display storage 160. If it is determined that the first information about the paired shutter glasses 200 has already been stored in the display storage 160 in the next pairing operation, the display apparatus 100 may read and use the first information stored in the display storage 160 without receiving the whole or the first information from the shutter glasses 200. The same way may be applied to even the shutter glasses 200.

It will be appreciated by those skilled in the art that changes may be made in these exemplary embodiments without departing from the principles and spirit of the invention, the scope of which is defined in the appended claims and their equivalents.

What is claimed is:

1. A display apparatus comprising:
    a display unit;
    a communication unit configured to communicate with shutter glasses and receive from the shutter glasses first information related to characteristics of the shutter glasses;
    a sync signal processor configured to generate a sync signal for causing the shutter glasses operate in accordance with a three-dimensional (3D) image displayed on the display unit;
    a storage configured to store second information for adjusting the sync signal; and
    a controller configured to select the second information based on the first information and control the communication unit to transmit the sync signal and the second information to the shutter glasses so that the shutter glasses operate based on an adjusted sync signal generated from the sync signal and the second information.

2. The display apparatus according to claim 1, wherein the second information corresponds with the first information, and
    wherein the controller is further configured to control an error message to be displayed on the display unit in response to the second information, which corresponds with the first information, not being stored in the storage.

3. The display apparatus according to claim 1, wherein the first information further comprises at least one of manufacturer or model information of the shutter glasses, a use time, a battery state, a polarizing method, an available frequency domain, an operating response time of the shutter glasses and a transmissivity depending on optical wavelengths.

4. The display apparatus according to claim 1, wherein the second information further comprises at least one of a delayed value of the sync signal and a duty value of the sync signal, and
    wherein the sync signal processor is further configured to adjust timing of the sync signal based on the second information selected by the controller.

5. The display apparatus according to claim 1, further comprising a video processor configured to process a video signal,
    wherein the controller is further configured to control the video processor to adjust display characteristics of the image based on the first information.

6. The display apparatus according to claim 5, wherein the display characteristics of the image comprises at least one of brightness, contrast, color temperature, and color coordinates of the image.

7. The display apparatus according to claim 1, wherein the communication unit is further configured to wirelessly communicate with the shutter glasses via one of a radio frequency (RF), Zigbee and Bluetooth.

8. Shutter glasses comprising:
    a lens unit configured to selectively transmit light;
    a communication unit configured to communicate with a display apparatus;
    a storage configured to store first information related to characteristics of the shutter glasses;
    a lens driver configured to drive the lens unit based on an adjusted sync signal; and
    a controller configured to control the communication unit to transmit the first information to the display apparatus, control the communication unit to receive second information corresponding to the first information and a sync signal from the display apparatus, and generate the adjusted sync signal from the sync signal and the second information.

9. The shutter glasses according to claim 8, wherein the second information comprises at least one of a delayed value of the sync signal and a duty value of the sync signal, and
    wherein, based on the second information, the controller is further configured to adjust at least one of a light transmission period of the lens unit and an operating timing of the lens unit.

10. The shutter glasses according to claim 8, wherein the first information comprises manufacturer or model information of the shutter glasses.

11. The shutter glasses according to claim 8, wherein the communication unit is further configured to wirelessly communicate with the display apparatus based on one of a radio frequency (RF), Zigbee and Bluetooth.

12. A method of controlling a display apparatus, the method comprising:
    receiving from the shutter glasses first information of an operational characteristic of shutter glasses;
    storing second information to be referenced when generating a sync signal for operating the shutter glasses in accordance with a displayed three-dimensional (3D) image;
    selecting the second information corresponding to the first information received from the shutter glasses; and
    transmitting the sync signal and the second information to the shutter glasses so that the shutter glasses operate based on an adjusted sync signal generated from the sync signal and the second information.

13. The method according to claim 12, wherein the transmitting the sync signal and the second information comprises displaying an error message in response to the second information, which corresponds to the first information, not being previously stored.

14. The method according to claim 12, wherein the first information comprises at least one of manufacturer or model information of the shutter glasses, a use time, a battery state, a polarizing method, an available frequency domain, an operating response time of the shutter glasses and a transmissivity depending on optical wavelengths.

15. The method according to claim 12, wherein the second information comprises at least one of a delayed value of the sync signal and a duty value of the sync signal,
the method further comprising:
adjusting a timing of the sync signal based on the second information selected corresponding to the first information.

16. The method according to claim 12, further comprising:
adjusting display characteristics of the image corresponding to the first information.

17. The method according to claim 16, wherein the display characteristics of the image to be adjusted comprises at least one of brightness, contrast, color temperature, and color coordinates of the image.

18. A method of controlling shutter glasses having a lens unit, the method comprising:
storing first information related to characteristics of the shutter glasses;
transmitting the first information to the display apparatus;
receiving second information corresponding to the first information and a sync signal from the display apparatus;
generating an adjusted sync signal from the sync signal and the second information; and
controlling an operation of the lens unit based on the adjusted sync signal.

19. The method according to claim 18, wherein the second information comprises at least one of a delayed value of the sync signal and a duty value of the sync signal, the method further comprising:
adjusting at least one of a light transmission period and an operation timing of the lens unit based on the second information.

20. The shutter glasses according to claim 18, wherein the first information comprises manufacturer or model information of the shutter glasses.

* * * * *